United States Patent [19]

Roberts

[11] Patent Number: 4,669,067
[45] Date of Patent: May 26, 1987

[54] METHOD AND APPARATUS FOR LOCATING A SUBMERGED MARINE STREAMER

[75] Inventor: F. Alex Roberts, Brea, Calif.

[73] Assignee: Chevron Research Company, San Francisco, Calif.

[21] Appl. No.: 763,379

[22] Filed: Aug. 6, 1985

[51] Int. Cl.⁴ .............................................. G01V 1/38
[52] U.S. Cl. ........................................ 367/19; 367/6; 367/106
[58] Field of Search ............................ 367/6, 19, 106; 181/110; 342/50, 42

[56] References Cited

U.S. PATENT DOCUMENTS

| | | | |
|---|---|---|---|
| 3,906,352 | 9/1975 | Parker | 367/19 |
| 3,918,056 | 11/1975 | Merrick | 342/46 |
| 3,921,124 | 11/1975 | Payton | 367/17 |
| 3,938,146 | 2/1976 | Dano | 342/44 |
| 4,042,923 | 8/1977 | Merrick | 342/42 |
| 4,063,213 | 12/1977 | Itria et al. | 367/17 |
| 4,087,780 | 5/1978 | Itria et al. | 367/17 |
| 4,254,480 | 3/1981 | French | 367/58 |
| 4,388,710 | 6/1983 | Pecon, Jr. | 367/106 |
| 4,446,538 | 5/1984 | Zachariadis | 367/19 |
| 4,404,664 | 9/1983 | Zachariadis | 367/19 |
| 4,532,617 | 7/1985 | Baecker et al. | 367/106 |

Primary Examiner—Thomas H. Tarcza
Assistant Examiner—Daniel T. Pihulic
Attorney, Agent, or Firm—S. R. LaPaglia; E. J. Keeling; V. A. Norviel

[57] ABSTRACT

A method is disclosed for locating the position of a marine streamer using two boats and a series of transponders in the streamer. A first pulse is electrically triggered and then generated by the transponders and by a transceiver mounted in the seismic vessel that tows the streamer. These first pulses are detected at a slave ship and the respective distances to the acoustic sources are calculated. The actual locations of the streamer transponders are calculated by trilateration when a second pulse from transponders 2-5 is detected at the slave ship. This second pulse is an acoustically triggered product of an electrically triggered initial pulse generated by a first transponder. This acoustically triggered pulse is used to determine the distance from the seismic ship to the transponder nearest the seismic ship and then to successively further transponders down the streamer length. Thereafter the positions of the transponders may be calculated.

2 Claims, 3 Drawing Figures

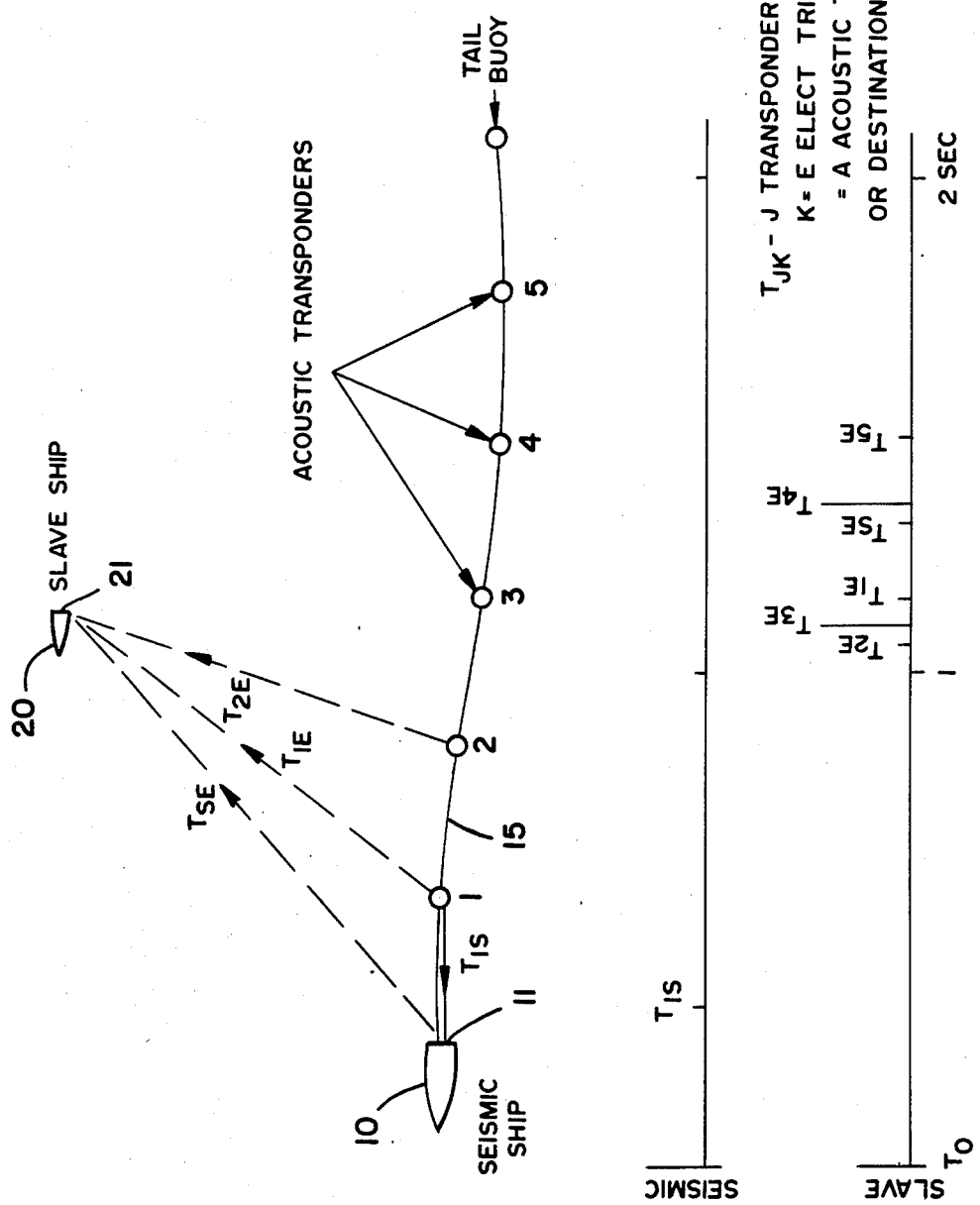

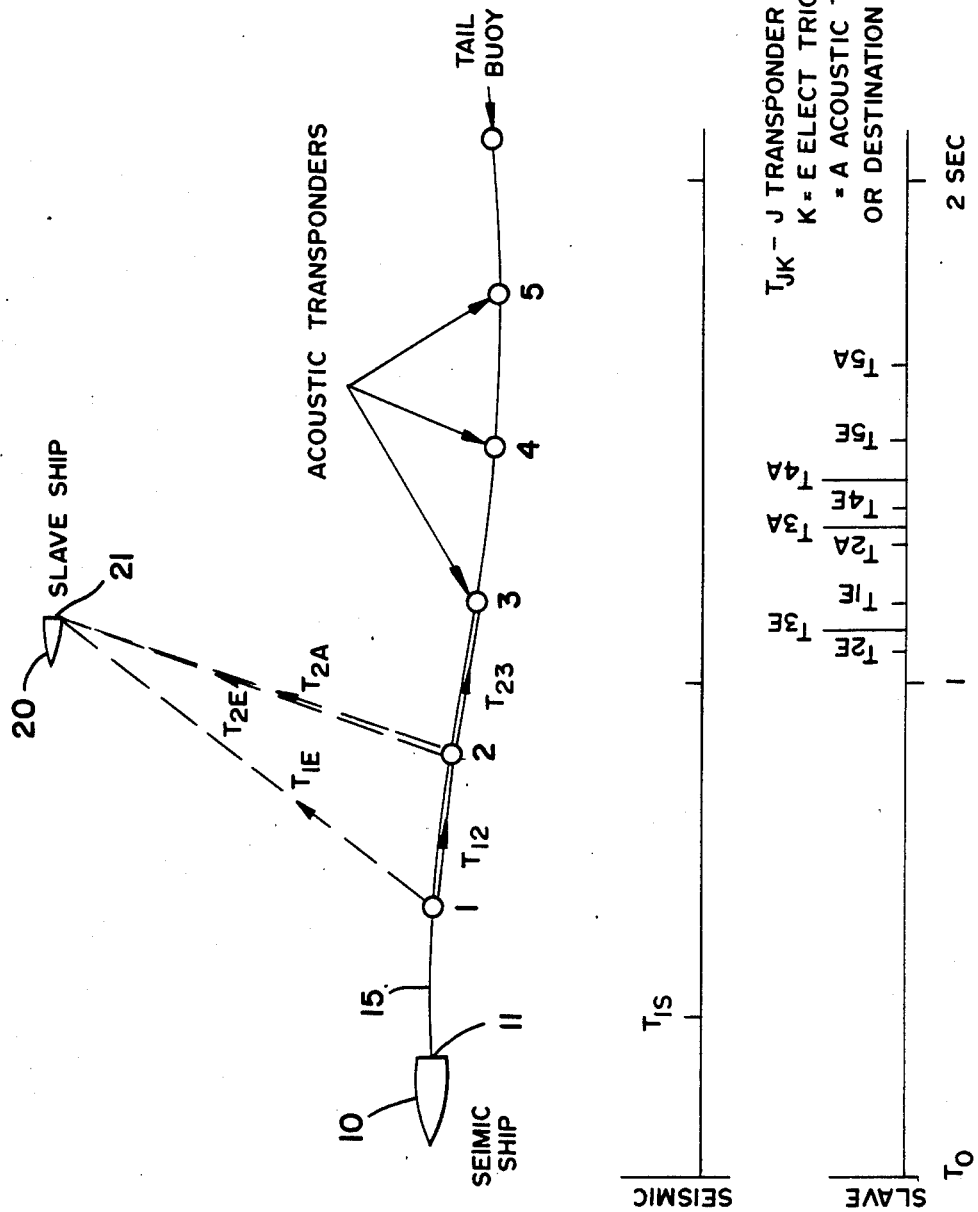

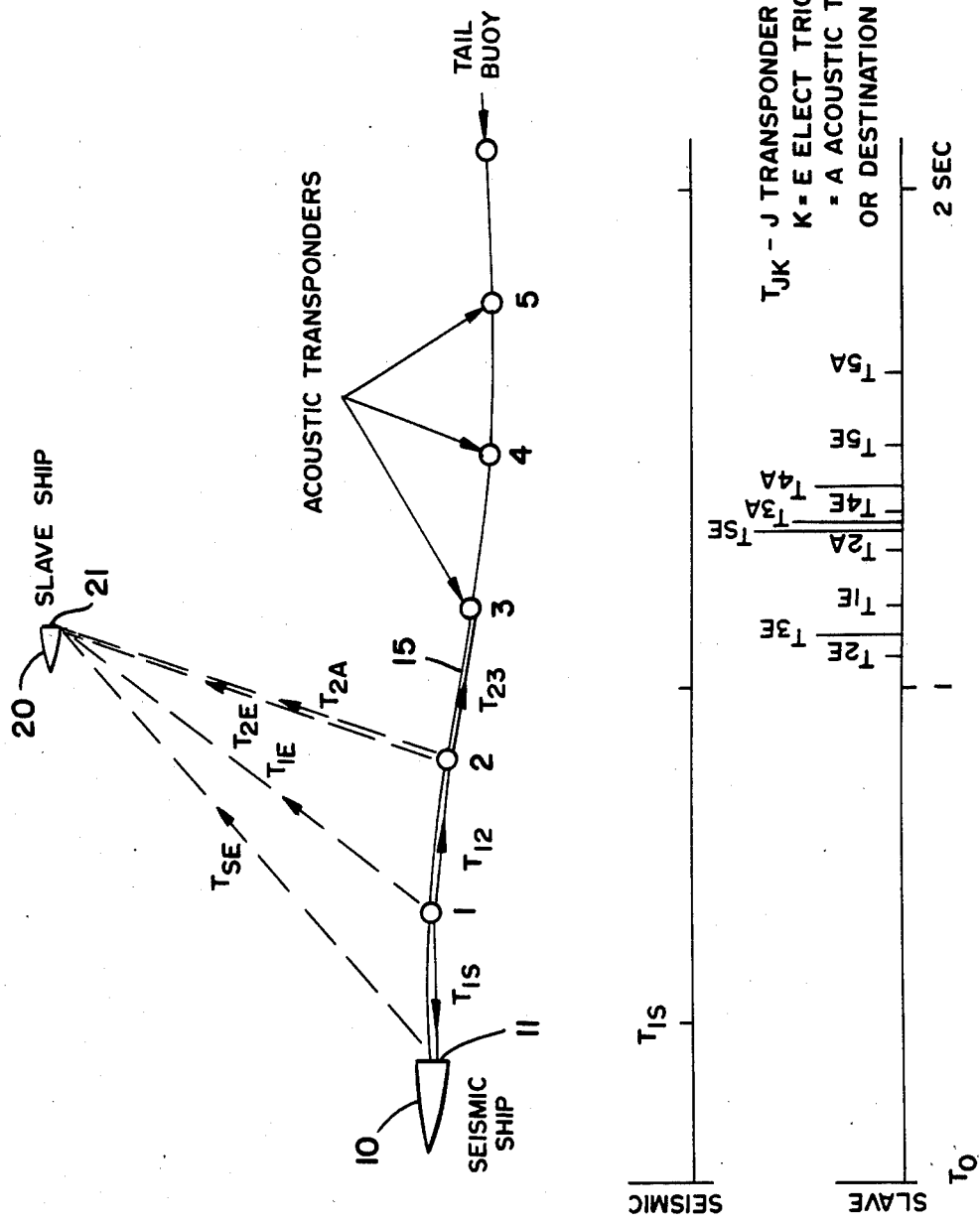

METHOD AND APPARATUS FOR LOCATING A SUBMERGED MARINE STREAMER

BACKGROUND OF THE INVENTION

1. Field of the Invention

The present invention finds principal application within the field of marine seismic exploration. More particularly, the invention is concerned with means for accurately determining the position of a towed marine seismic streamer.

2. Prior Art

In marine seismic prospecting, an exploration vessel tows a seismic streamer having a plurality of pressure sensitive detectors, commonly referred to as hydrophones. A source of seismic energy, such as an air gun or an explosive charge, is used to propagate pressure waves through the water into the underlying sea floor. Part of the energy will be reflected by subfloor geological discontinuities and subsequently detected by the hydrophones as pressure variations in the surrounding water. The mechanical energy of these pressure variations is transformed into an electrical signal by the hydrophones and transmitted through the streamer to a recording apparatus aboard the vessel. The collected data may then be interpreted by those skilled in the art to reveal information about the subsea geological formations. Modern methods of seismic data collection use redundant subsurface coverage by successive source-hydrophone positions. This allows the data to be stacked to enhance the signal to noise ratio.

For the signals to be meaningful and to permit correct stacking of signals from different source and hydrophone positions, it is necessary to known the placement of the individual hydrophones at the time the pressure waves are detected. As the vessel is continuously moving and as the streamer may extend for thousands of feet behind the vessel, accurate location of the streamer hydrophones is difficult.

Various systems have been developed to provide accurate information as to the location of the vessel. The most common means of identifying the position of the streamer is by satellite and radio navigation fixes on the vessel, and then some estimation of the streamer location. Another less common method involves the use of bottom founded ocean transponders to be interrogated by streamer bound transceivers. Here, the vessel's position with respect to the transponders may be triangulated if the location of the transponders are known.

However, it is rare for the streamer to trail directly along the path of the vessel. While the streamer is attached to the stern of the vessel, the bulk of the streamer is submerged below the water surface through the action of depth controllers along the length of the streamer. As a result, the cross-track current velocity at the streamer depth may differ from the cross-track current affecting the vessel, thereby causing the streamer to trail at an angle to the vessel's course. Other factors, which are not necessary to enumerate, may also create a variance in the path of the streamer when compared to the vessel track.

One method of estimating the location of the streamer disclosed in the prior art relies upon the addition of a tail buoy radar reflector located at the end of the streamer. On-board radar systems may then be used under optimal sea conditions to find the end of the streamer and the location of the individual hydrophones interpolated. Such system are generally unreliable however, and render the required data suspect.

A second method taught by the art relies upon very sensitive and expensive apparatus to measure the yaw and pitch angles of the streamer end adjacent the vessel. See Rice Jr. et al, U.S. Pat. No. 4,068,208. These data, coupled with magnetic compass headings taken along the streamer and the known depth of the streamer, permits one to empirically calculate the hydrophone locations.

Another method may use an acoustic source mounted on the vessel. This source is used to interrogate hydrophones located in the streamer to determine their distance from the vessel. See Brown, U.S. Pat. No. 3,840,845; Itria, et al, U.S. Pat. Nos. 4,063,213 and 4,087,780; and Roberts, U.S. Pat. No. 4,376,301.

There are also methods that employ two boats to simultaneously transmit acoustic pulses to locate a submerged marine streamer. However, the basic problem with these types is their lack of acoustic range in the surface layer of the ocean due to the high attenutation caused by entrapped gases and the inherent negative velocity character of this layer. Under certain conditions sound waves are deflected downward away from surface level equipment, which means that the effort to locate the position of the streamer will be hampered.

ADVANTAGES OF THE INVENTION

The present system has several advantages over prior methods, such as:

1. Only a very short acoustic range is required along the path of the streamer (this is the most difficult direction to propagate acoustic energy because of necessary physical design constraints on streamer mounted transponders).

2. The electrical or inductive triggering of the streamer transponders is more reliable than the triggering by acoustics from the seismic ship. Apart from the range problem there is also the problem of pitching and rolling of the seismic ship, and its effect on the seismic ship's transponder view of the streamer transponders.

3. Because the initial triggering of the streamer transponders is done electrically, the acoustic propagation time along the streamer is eliminated, the cycle time is halved and therefore twice as much data is collected in a given time.

SUMMARY OF THE INVENTION

A method is disclosed for locating the position of a marine seismic streamer. It comprises a method for locating the position of the towed marine streamer, using two boats, a seismic vessel and a slave ship.

Mounted on the seismic vessel and the slave ship are acoustic transceivers. Both the seismic vessel and the slave ship are equipped with a radio navigation system and a radio telemetering system to transmit ship and streamer positioning data. Spaced along the streamer are acoustic transponders which can be triggered by an inductive electrical pulse sent down the streamer from the seismic vessel or individually by an acoustic pulse, each transponder recognizing a unique acoustic frequency. All of this radio, electrical, acoustic, and computing equipment of the design used in this system are within the state of the art.

The operation of the system is as follows. At time zero ($T_0$) the seismic vessel's transceiver and all of the streamer transponders are electrically triggered from the seismic vessel. The vessel's transceiver and all of the transponders each transmit a pulse of acoustic energy on a unique frequency. Concurrently, the $T_0$ time is also transmitted by radio to the slave ship. Then the slave ship's acoustic receiver measures the time from $T_0$ to the arrival of each pulse from each of the streamer transponders, $T_{1E}$, $T_{2E}$, $T_{3E}$, etc. and the seismic vessel's transmission, $T_{SE}$. Afterwards, this data is transmitted by radio to the seismic vessel.

The seismic vessel's acoustic transceiver receives and measures the transmission time from $T_0$ of an acoustic pulse (from the streamer transponder No. 1, which is the nearest streamer transponder to the seismic vessel) to the arrival of the acoustic pulse ($T_{1S}$) at the seismic vessel. The travel time $T_{SE}$ (between the seismic vessel and the slave ship), $T_{1E}$ (between streamer transponder No. 1 and the slave ship), and $T_{1S}$ (between streamer transponder No. 1 and the seismic vessel) are converted to distances by multiplying the velocity of sound in sea water times the travel time. Here, the velocity of sound in sea water is monitored each time the seismic shot is recorded by comparing the distance between the seismic vessel and the slave ship (which are determined by radio navigation) to the time of travel of the acoustic pulse from the seismic vessel to the slave ship ($T_{SE}$). Furthermore, the position of the seismic vessel and the slave ship are continuously being updated by each radio navigation system in a manner typical of a seismic marine surveys. The slave ship transmits, by radio, its position to the seismic vessel. Then, from a knowledge of the positions the seismic vessel and the slave ship and the acoustically determined distances from: (1) the seismic vessel to the slave ship; (2) the first streamer transponder to the slave ship; and (3) the first streamer transponder back to the seismic vessel, the exact position of the first streamer transponder may be determined by trilateration.

The electrically triggered transmission from each streamer transponder is recognized by its neighboring streamer transponder (i.e., the next neighbor farther away from the seismic vessel) as a unique acoustic triggering pulse. So that each streamer transponder other than the one nearest the seismic vessel (transponder No. 1) transmits two pulses, the first one is triggered by an electrical signal transmitted down the streamer's internal electric cable and the second one is triggered by an acoustic pulse that arrives from the next transponder nearer to the seismic vessel. These second, acoustically triggered signals, that are received by the slave ship, are used to determine the straight line distances between the streamer transponders. The straight line distances enable a progressive trilateration down the streamer from transponder to slave ship to the neighboring transponder.

This trilateration is initiated once the slave ship receives a second pulse from streamer transponder No. 2 which is designated as $T_{2A}$ and is measured from $T_0$. The transmission time of the pulse from streamer transponder 1 to streamer transponder 2 is $T_{12}$ which equals $T_{2A} - T_{2E}$ (see FIG. 2). $T_{1E}$, $T_{2E}$, and $T_{12}$ may be converted to distances by multiplying the velocity of sound in sea water by the elapsed time. Since the positions of the slave ship and transponder 1 are known, the distances between transponder 1 and 2 are known, and the distances between transponder 2 and the slave ship are known, the position of transponder 2 may be calculated by trilateration. Thereafter, this procedure is repeated for the remaining streamer transponders until all streamer transponder positions are known. This is repeated ater each seismic shot to continuously monitor the position of the streamer and its hydrophone groups.

BRIEF DESCRIPTION OF THE DRAWINGS

FIG. 1 is a schematic view of the streamer location system and a time chart of the signal reception in which the inductive triggering of the transceivers is shown;

FIG. 2 is another representation of the streamer location system and time chart in which the acoustic triggering of the second transceiver is shown; and FIG. 3 is a combinationof FIGS. 1 and 2.

DETAILED DESCRIPTION OF THE INVENTION

Upon review of the drawings, FIGS. 1–3 show a seismic vessel 10 with an acoustic transceiver 11 for sending command or interrogating acoustic signals as well as receiving signals through the water. The vessel 10 is shown towing a streamer 15 that houses transponders 1–5 (for example) and a plurality of other equipment (not shown) normally associated with seismic surveys of ocean sea floors. The streamer transponders 1–5 are of a unique design. They can be triggered to transmit either from a received acoustic interrogation pulse (a normal transponder action), or inductively from an electrical pulse via the streamer 15 (as with remote controlled streamer depth controllers). To distinguish between each transponder and the two different triggering modes of each transponder, reply transmissions are on unique frequencies as is the acoustic triggering pulse frequency for each transponder. The system will require 12 to 16 frequency channels where a typical acoustic navigation system has 8 or 16 channels. A slave ship 20, also having an acoustic transceiver 21, is shown moving at approximately the same speed on a parallel course approximately half way downstream of the seismic vessel 10 along the streamer 15 length. The slave ship 20 is set approximately 500 meters offline from the streamer 15.

FIGS. 1–3 also show examples of a timing diagram of the sequence of transmission between the seismic vessel 10 and the slave ship 20. The paths for the acoustic pulses are shown by the dashed lines and are designated by $T_{JK}$, where J is the number of the transponder that initiates the pulse and K is either the inductively generated elect trigger (E), the acoustic trigger (A) or the destination point (i.e., seismic vessel, or Transponder 1–5).

The following two-boat streamer location system is designed to overcome problems due to high pulse attenuation and the relative differences in the velocity character of certain layers of sea water. This system limits the required maximum acoustic range to a little over one-half the streamer length and it relies on the fact that each transponder acoustically triggers another acoustic pulse from a previous transponder to the next one down the streamer 15.

The system operation starts with $T_0$ with the electrical triggering of the vessel transceiver 11 and streamer transponders, each transmitting a pulse of acoustic energy at the same time instant, each on a unique frequency. The streamer transponders are triggered inductively (elect trigger), via the streamer 15, on command from the seismic vessel 10. The vessel transceiver acoustic pulse ($T_{SE}$, i.e. S=the source of the pulse is the seismic vessel, and E=elect trigger) and the transponder acoustic pulses ($T_{1-TE}$) are received by the slave ship 20 which, with the time zero ($T_0$) data received via a radio link from the seismic vessel 20, is able to calculate acoustic travel times between each acoustic transmitter (i.e., the vessel transceiver 11 and the transponders 1-5) and each receiver (i.e., the slave ship tansceiver 21 and the seismic vessel receiver 11). For example, see FIG. 1.

To establish the position of the streamer transponder nearest to the seismic ship (i.e. #1) the seismic vessel 10 has to receive the electrically triggered acoustic pulse ($T_{1S}$, i.e., 1=pulse source, and S is the destination point) from transponder 1. This pulse and timing by the seismic vessel 10 is crucial to the success of the scheme since the algorithm that calculates streamer transponder locations is started by calculating the position of the streamer transponder 1. The range is not great, i.e., 300 to 500 meters to the streamer transponder 1, but to increase the probability of success of locating the remaining transponders 2-5, it could be designed such that the first two or three transponders nearest the seismic vessel 10 are received and timed.

Once all the acoustic pulses are received (all but one at the slave ship), the travel times between the acoustic sources and the receivers may be calculated. This is done by multiplying the travel times (i.e., $T_{SE}$ equals the pulse travel time between the seismic vessel 10 and the slave ship 20; $T_{1E}$ equals the pulse travel time between streamer transponder 1 and the slave ship 20; $T_{1S}$ equals the pulse travel time between streamer 15 and transponder 1 and the seismic vessel 10; etc.) by the velocity of sound in sea water. The velocity of sound in sea water is continuously calculated by comparing the distance between the seismic vessel 10 and the slave ship 20 (determined by radio link) with the travel time of the acoustic pulse, $T_{SE}$, from the seismic vessel 10 to the slave ship 20. (The acoustic pulse that is used to determine the acoustic velocity in sea water may be generated at either the seismic vessel 10 or the slave ship 20 and received at the other point.) Once the distances are determined between the seismic vessel 10 and the slave ship 20, the seismic vessel 10 and streamer transponder 1, and streamer transponder 1 and the slave ship 20, the exact position of streamer transponder 1 may be calculated by trilateration (as the exact position of the seismic vessel 10 and the slave ship 20 are already known by radio navigation). The term "trilateral" implies that the position of a point (e.g., a transponder position) is determined by finding the lengths of each of three distances forming a triangle with the located point being streamer transponder 1 at one angle of the triangle, and the seismic vessel 10 and the slave ship 20 at each of the other two angles.

The second step to determine the position of each streamer transponder is generated by a second, *acoustically* triggered pulse from each of the streamer transponders except transponder 1. For example, streamer transponder 2 receives and recognizes the acoustic pulse ($T_{12}$) from streamer transponder 1 and is triggered to retransmit another pulse ($T_{23}$) at its own unique frequency. For example, see FIG. 2. Thereafter, streamer transponder 3 receives and recognizes acoustic pulse ($T_{23}$) from streamer transponder 2 and is also triggered to retransmit another pulse at its own frequency. This sequence continues all the way down the streamer 15 to trigger each transponder to emit a pulse at its own frequency.

These second, acoustically triggered pulse are also received by the slave ship 20 and are used to determine the straight line distances between streamer transponders. For example, the *electrically* triggered acoustic pulse emitted by transponder 1, and designated $T_{12}$, is received at transponder 2 which is then *acoustically* triggered to emit another pulse, designated $T_{2A}$. $T_{2A}$ is then received at the slave ship 20 which counts the elapsed time between $T_0$ and $T_{2A}$ recipt. That elapsed time has two components, the straight line distance from transponder 1 to transponder 2 and the distance from transponder 1 to the slave ship 20 (through transponder 2). Since the total time it takes to travel the total distance is known ($T_{2A}$), and the time it takes to travel from transponder 2 to the slave ship 20 is known ($T_{2E}$), solving for the unknown distance ($T_{12}$) is a relatively easy task.

$$(T_{2A}-T_0)-(T_{2E}-T_0)=T_{12}$$

Once $T_{12}$ is known it may be multiplied by the acoustic velocity in sea water (which is monitored each time a seismic shot is taken) to get the distance from transponder 1 to transponder 2. The position of transponder 2 may then be determined by trilateration as the position of the slave ship 20 is known from the radio navigation equipment and the position of streamer transponder 1 is known by the positioning determination outlined above.

This process of acoustic triggering of another acoustic pulse occurs successively down the length of the streamer cable 15 and the calculations are likewise performed to fix the position of transponders 3, 4, and 5. The position calculations are based on the previous transponder because the streamer is moving and a continuous update of the position of the seismic vessel 10 and slave ship 20 is used to minimize the change in distance due to the movement in location (even though the relative distance change is minimal). See also U.S. application Ser. Nos. 476,690 and 637,445 for position correction of a moving streamer cable. Ultimately, once the positions of the transponders are known, the positions of the hydrophone groups in the streamer may be calculated. This process is initiated and repeated after each seismic shot to continuously monitor the position of the streamer 15, and consequently, the hydrophone groups.

Since many modifications and variations of the present invention are possible within the spirit of this disclosure, it is intended that the embodiments disclosed are only illustrative and not restrictive. For that reason, reference is made to the following claims rather than to the specific description to indicate the scope of this invention.

What is claimed is:

1. A method for locating the position of a towed marine streamer, using a seismic vessel and a slave ship, comprising the steps of:
    (a) towing a marine streamer through the sea behind a seismic exploration vessel;
    (b) positioning a slave ship in a parallel relationship with said seismic vessel approximately one half way down the streamer length and off line from the streamer by approximately the same distance;
    (c) frequently fixing the absolute and relative position of the slave ship and the seismic vessel by radio navigation;
    (d) generating a test acoustic pulse by a transceiver mounted on the seismic vessel at time zero ($T_0$);
    (e) inductively generating a plurality of acoustic pulses all at $T_0$ by transponders including at least a first streamer transponder and a plurality of additional streamer transponders mounted in a spaced apart relationship in the streamer, each of said streamer transponders transmitting an acoustic pulse of a unique frequency;

(f) detecting all of said inductively generated acoustic pulses and said test acoustic pulse at a receiver mounted on the slave ship;

(g) determining the acoustic velocity of said test acoustic pulse in sea water by comparing the actual distance between the seismic vessel and the slave ship, as determined by radio navigation, with the time it takes for said test acoustic pulse to travel between the seismic vessel and the slave ship;

(h) detecting an inductively generated acoustic pulse from a first streamer transponder at its own unique frequency at said transceiver mounted on said seismic vessel;

(i) determining the acoustic travel time of said inductively generated acoustic pulse from said first streamer transponder to said seismic vessel transceiver and then the distance between said first streamer tansponder and said seismic vessel transceiver;

(j) determining the acoustic travel times of said inductively generated acoustic pulses from each streamer transponder to said slave ship and the distances between each streamer transponder and the slave ship to establish a first line of position;

(k) determining the position of said first streamer transponder by trilateration using the known positions of the seismic vessel and the slave ship and the distance between said first transponder and the seismic vessel and said first transponder and the slave ship;

(l) receiving said inductively generated acoustic pulse generated by said first stream transponder at the second streamer transponder and recognizing said pulse as a unique acoustic triggering frequency;

(m) in response to said received inductively generated acoustic pulse generated by said first streamer transponder, triggering an acoustic pulse at the unique frequency of the second streamer transponder;

(n) detecting said acoustically triggered acoustic pulse from said second streamer transponder at said receiver of the slave ship;

(o) determining the elapsed travel time from $T_0$ to the receipt of the acoustically generated acoustic plane at the slave ship and the distance between said first streamer transponder and said second stream transponder;

(p) determining the position of said second streamer transponder by trilateration using the known positions of the first streamer transponder and the slave ship and the distances between the second streamer transponder and both the slave ship and the first streamer transponder; and (q) repeating the position determining procedure outlined in steps l-p for each subsequent transponder.

2. A method for locating the position of a submerged marine streamer towed by a seismic exploration vessel, in which a slave ship is used, comprising the steps of:

(a) fixing the positions of a seismic vessel and a slave ship which are moving in a substantially parallel relationship and determining the distance between the vessel and the ship;

(b) electrically triggering acoustic pulses of unique frequencies, said pulses being generated at least by transponders mounted in a cable which is towed behind said seismic vessel;

(c) detecting said acoustic pulses at said slave ship and said seismic vessel;

(d) determining the acoustic velocity of an acoustic pulse in sea water;

(e) determining the distances between the streamer transponder nearest the seismic vessel (designated streamer transponder 1) and the seismic vessel, and streamer transponder 1 and said slave ship;

(f) determining the position of said streamer transponder 1 using the knonw positions of both the seismic vessel and the slave ship and the respective distances between streamer transceiver 1 and the seismic vessel and the slave ship;

(g) detecting the electrically triggered acoustic pulse from streamer transponder 1 at the next closest streamer transponder (designated streamer transponder 2) and simultaneously acoustically triggering a second pulse;

(h) detecting said acoustically triggered acoustic pulse at said slave ship;

(i) determining the distance from said streamer transponder 2 to said streamer transponder 1 and from said streamer transponder 2 to said slave ship;

(j) determining the position of said streamer transponder 2 using the known positions of said slave ship and said streamer transponder 1; and (k) repeating the following steps for each remaining streamer transponder;

detecting the acoustic pulse of the last streamer transponder whose position has been determined by the next streamer transponder further away from the seismic vessel;

simultaneously acoustically triggering another acoustic pulse by said next streamer transponder;

detecting said acoustically triggered acoustic pulse at said slave ship;

determining the distances between said next streamer transponder and said slave ship and said last streamer transponder whose position has been fixed; and determining the position of said next streamer transponder using the known position of said slave ship and said last streamer transponder whose position has been fixed.

* * * * *

UNITED STATES PATENT AND TRADEMARK OFFICE
CERTIFICATE OF CORRECTION

PATENT NO. : 4,669,067
DATED : May 26, 1987
INVENTOR(S) : F. ALEX ROBERTS

It is certified that error appears in the above–identified patent and that said Letters Patent are hereby corrected as shown below:

Column 7, Line 37 "first stream", should read -- first streamer.

Column 7, Line 50 "acoustic plane", should read -- acoustic pulse.

Column 7, Line 52 "second stream", should read -- second streamer.

Column 8, Line 24 "knonw", should read -- known.

Signed and Sealed this

Thirteenth Day of October, 1987

Attest:

DONALD J. QUIGG

Attesting Officer

Commissioner of Patents and Trademarks